United States Patent
Goodwin, III

(10) Patent No.: US 6,532,232 B1
(45) Date of Patent: Mar. 11, 2003

(54) METHOD AND SYSTEM FOR TRANSPORTING AUDIO/VIDEO DATA OVER A SERIAL BUS

(75) Inventor: James S. Goodwin, III, Santa Clara, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/259,481

(22) Filed: Feb. 26, 1999

(51) Int. Cl.$^7$ .......................... H04L 12/28; G06F 13/28
(52) U.S. Cl. .................. 370/389; 370/474; 710/24; 710/308
(58) Field of Search .................. 370/411–418, 389, 370/392, 473, 476, 252, 474; 710/48, 52, 56, 58, 305, 68, 308, 310, 266, 20–24; 348/513, 467, 473, 423.1

(56) References Cited

U.S. PATENT DOCUMENTS

| | | | | |
|---|---|---|---|---|
| 5,915,127 A | * | 6/1999 | Ogawa | 395/280 |
| 6,172,989 B1 | * | 1/2001 | Yanagihara | 370/473 |
| 6,373,821 B2 | * | 4/2002 | Staats | 370/252 |

* cited by examiner

*Primary Examiner*—Steven Nguyen
(74) *Attorney, Agent, or Firm*—Martine & Penilla, LLP

(57) ABSTRACT

The present invention provides methods and a system for transporting A/V data over a serial bus. A memory space is allocated for a set of buffers to store a plurality of CIPs. Each of the CIPs includes a header field and a data field with the header field having a SYT field for storing a presentation time. Initial CIP header values are generated including initial SYT field values for each of the CIP header fields in the set of buffers. A circular DMA script program is generated and configured to describe a set of full and empty CIPs for each of the buffers. The circular DMA script program is configured to transmit the CIPs from the buffers. The generated DMA script program is executed to sequentially transmit the CIPs from the buffers by traversing the buffers in a circular manner so that the transmitted CIPs are presented at the associated presentation time. The DMA script program generates an interrupt periodically to copy new CIP data into the CIP fields of buffers from which the CIPs have been transmitted such that the new CIP data including new SYT field values are set up for transmission in advance.

35 Claims, 11 Drawing Sheets

METHOD AND SYSTEM FOR TRANSPORTING AUDIO/VIDEO DATA OVER A SERIAL BUS

BACKGROUND OF THE INVENTION

1. Field of the Invention

This invention relates generally to computer systems, and more particularly to methods for efficiently transmitting isochronous data between a computer system and a peripheral.

2. Description of the Related Art

Modern computer systems require a communication link to connect various subsystem components to other subsystem components. The various subsystem components such as a processor, memory, and input/output (I/O) devices are coupled to the bus for communication. Typically, the communication link is a bus, which includes a set of wires coupling the subsystem components and the host computer.

Buses broadly fall into two categories: parallel bus and serial bus. The parallel bus transmits a set of data bits in parallel over parallel lines. Thus, the parallel bus generally provides a fast data transfer rate. However, due to physical factors such as cross-talk, clock skew, and synchronization problems, the use of parallel bus has been limited to short distances.

On the other hand, the serial bus transmits data serially over a longer distance than the parallel bus by using a cable to communicate serial data. The serial bus is especially useful for connecting a computer system to a variety of peripheral devices that have a wide range of data bandwidth requirements. Currently several standards for serial data transmission exist, such as Ethernet, Localtalk, RS-422, Universal Serial Bus (USB), etc. Typically, these types of serial transmission systems can transmit information up to about 10 megabits per second. More recently, the computer industry has been driven toward a faster serial data transmission standard, especially in communicating with peripheral devices.

In 1995, the Institute of Electrical and Electronic Engineers (IEEE) approved a serial bus standard for a high-speed serial data transmission architecture. The standard is known as 1394–1995 IEEE Standard for a High Performance Serial Bus, which is incorporated herein by reference. The IEEE 1394 bus is often referred to as FireWire™. The purpose of the 1394 standard is to provide a high-speed low cost serial bus for use as a peripheral bus or a parallel back-plane bus.

The IEEE 1394 serial bus standard provides significant advantages over conventional bus standards. One advantage of the 1394 standard is the ability to transmit data over a cable medium at variable speeds, including very high speeds. For example, transceiver chip sets for the 1394 standard are now running at speeds of up to 400 Mbps, and many companies anticipate reaching speeds of up to one Gbps (gigabits per second). The 1394 cable comes in two versions, a and b, and starts at 400 Mbps (megabits per second) to 1, and up to 1.6 Gbps. Due to its high transmission rate, the IEEE 1394 bus is projected to be the standard cable to connect high speed drives that are connected by parallel cables such as IDEs and SCSIs. The basic clock frequency of the 1394 standard is 24.576 MHz, and data is transmitted in multiples of 24.576 MHz.

Another advantage of the 1394 cable is that it allows both data and power to be transmitted such that simple, low power devices can be powered directly from the cable. To implement the dual functions of carrying data and power, the 1394 cable contains two twisted pairs of wires for carrying data signals and two additional wires for power. Furthermore, the 1394 cable can connect two components up to about 15 meters apart without a repeat assignment. In addition, it allows daisy chain connection of subsystem components.

The IEEE 1394 serial bus standard also supports a variety of protocols such as IP, ethernet, SCSI, digital audio, digital video, etc. The support for digital audio and digital video protocols, in particular, allows the IEEE 1394 serial bus to be used in communicating digital audio and/or video (A/V) data between a computer system and consumer electronic products. For example, the IEEE 1394 bus can be used to communicate digital A/V data between a host computer system and conventional consumer electronic devices such as camcorders, DVD players, CD players, digital cameras, HD TVs, etc.

FIG. 1 shows a computer system 100 including a host computer 102 coupled to a camcorder 104. Thee host computer 102 is coupled to the camcorder 104 via an IEEE 1394 serial bus 106. In this arrangement, the host computer 102 transmits digital A/V data to the camcorder 104 over the IEEE 1394 bus 106. The camcorder 104 receives the A/V data for display. Alternatively or simultaneous with displaying the A/V data, the camcorder 104 may record the received A/V data on a recording medium for storage.

The transmission of digital A/V data over the IEEE 1394 serial bus between a host computer and a peripheral electronics device is generally carried out in isochronous transactions. In isochronous transactions, a peripheral device is provided a guaranteed access to the bus at specific time intervals. Specifically, IEEE 1394 serial bus A/V devices transmit data in the form of data packets commonly known as Common Isochronous Packets (CIPs). Using these data packets, the IEEE 1394 serial bus allows a peripheral device to transmit/receive a CIP via the bus at 125 μs intervals or 8,000 times per second.

FIG. 2 illustrates a structure of a CIP 200 for transmitting A/V data over an IEEE 1394 serial bus. The CIP 200 includes a CIP payload 202 and a CIP header 204. The CIP payload 202 corresponds to the payload portion of the packet that contains data defined by an application layer. On the other hand, the CIP header 204 includes various header fields including a format dependent field (FDF) 206.

The FDF 206 includes a plurality of fields. One of the fields in the FDF 206 is a synchronization time (SYT) field 106. The SYT field 106 in the CIP header 104 is used to store a presentation time stamp for the associated CIP 200. The presentation time specifies the time at which to present the packet data for display in the case of a video data or for play in the case of an audio data.

The IEEE 1394 serial bus is often used in computer systems that operate under an operating system, (e.g., Microsoft® Windows 95®, Windows 98®, and the like), which may provide preemptive multitasking environment. In such an environment, transmission of CIP based data from a host computer to a peripheral A/V device may present several problems due to the real time requirements of A/V protocols. More specifically, the A/V protocols were originally specified to facilitate transfer of A/V data between consumer electronic devices such as VCRs, TVs, camcorders, and the like. These consumer devices typically include a micro-controller that provides the customized hardware support for the A/V protocols. For instance, the micro-controllers provide time-stamp, synchronization, and other support for the real time transmission and presentation of A/V data.

Within a computer system, however, the real time A/V data processing requires substantial processor time to set up and transmit CIPs. For example, in a preemptive multitasking environment, the host computer typically computes and creates a presentation time in advance of the transmission of a data packet. On the receiving end, the A/V devices generally include a high-resolution timer, which allows creation and attachment of SYT field data on-the-fly. For proper synchronization, the host computer adjusts the presentation time during the transmission of a series of CIP data packets to ensure that it matches the data rate expected by an A/V device receiving the data packets. In general, the transmission rate of the full CIP data packets exceeds the expected data rate. Hence, if the presentation time of the SYT field 106 is not properly matched with the expected data rate, the A/V device may exhibit jitter during the display of video data or during the play of audio data.

To reduce such jitter effect, conventional techniques have sought to match the transmission data rate with the expected data rate. To that end, these approaches have typically adjusted the presentation time by creating and inserting empty CIPs from within a preemptive multitasking environment. The creation and insertion of the empty CIPs had the effect of reducing the transmission data rate down to the rate expected by the A/V device.

Conventional computer systems have implemented these matching techniques by creating and modifying direct memory access (DMA) script programs to transmit both empty and non-empty CIPs. FIG. 3 illustrates a flowchart of a conventional method for creating DMA script programs for transmitting CIP data packets. The method begins in operation 302 and proceeds to operation 304, where buffers are initially filled with A/V data. Then in operation 306, CIP headers and SYT field values are created and inserted into the buffers that are arranged in a linear fashion. Next in operation 308, empty CIPs for the initial data buffers are calculated and inserted into the buffers. Operation 308 completes initial setup stage.

After the initial setup stage, a linear DMA script program describing full and empty CIPs are created in operation 310. Then, the linear DMA script program is, in operation 312, started on a particular cycle. In operation 314, the initial data buffers are detached and new data buffers are attached (i.e., allocated) on-the-fly. Next, CIP headers and SYT field values are created and inserted into the newly attached buffers on-the-fly in operation 316. Then in operation 318, a new linear DMA script program is created and dynamically appended on-the-fly. This process continues until all desired A/V data have been transmitted. The method then terminates in operation 320.

While this method of creating DMA script programs to transmit CIP based data produces reasonable results, it utilizes significant processor resources. This is because a processor must create the script program many cycles in advance of execution in order to overcome operating system latencies. More specifically, the calculations, adjustments, and creation of SYT field value and the empty CIPs must be done on-the-fly by the CPU many cycles in advance of transmission of CIPs. Such processing requirements generally result in a very large and complex DMA script programs.

Furthermore, these DMA script programs were usually generated and modified in a linear fashion so that the DMA script programs were very lengthy. Such lengthy and complex DMA script programs generally require a greater CPU utilization, thereby reducing the availability of the CPU for other devices or subsystems in a computer system. In addition, the presentation time in the SYT field of the conventional method tended to drift away from the expected data rate with time. This drift in SYT value is typically caused by some missed or lost isochronous cycles.

Thus, what is needed is a method and system for efficiently transmitting isochronous A/V data packets without significant processor utilization. In addition, what is also needed is a method and system that can efficiently generate and adjust SYT field values and empty CIPs.

SUMMARY OF THE INVENTION

The present invention fills these needs by providing methods and system for isochronously transporting audio and/or video (A/V) data in common isochronous packets (CIPs) over a serial bus. It should be appreciated that the present invention can be implemented in numerous ways, including as a process, an apparatus, a system, a device, a method, or a computer readable medium.

In one embodiment, the present invention provides a method for isochronously transporting A/V data in CIPs over a serial bus. A memory space is allocated for a set of buffers to store a plurality of CIPs. Each of the CIPs includes a header field and a data field with the header field having a synchronization time (SYT) field for storing a presentation time. Initial CIP header values are generated including initial SYT field values for each of the CIP header fields in the set of buffers. A circular DMA script program is generated and configured to describe a set of full and empty CIPs for each of the buffers. The circular DMA script program is configured to transmit the CIPs from the buffers. The generated DMA script program is executed to sequentially transmit the CIPs from the buffers by traversing the buffers in a circular manner so that the transmitted CIPs are presented at the associated presentation time. The DMA script program generates an interrupt periodically to copy new CIP data into the CIP fields of buffers from which the CIPs have been transmitted such that the new CIP data including new SYT field values are set up for transmission in advance.

In another embodiment, the present invention provides a computer system for isochronously transporting A/V data in CIPs over a serial bus. The system includes a bus, a main memory, a processor, and a host interface. The main memory is coupled to a bus and is configured as a set of buffers to store a plurality of CIPs. Each of the CIPs includes a header field and a data field. The header field has a SYT field for storing a presentation time. The processor is coupled to the bus to generate initial CIP header values including initial SYT field values for each of the CIP header fields in the set of buffers. The processor generates a circular DMA script program that describes a set of full and empty CIPs for each of the buffers, the circular DMA script program being configured to transmit the CIPs from the buffers. The host interface is coupled to the bus and includes a host link device and a PHY device. The host interface being configured to receive and transmit the CIPs from the buffers to a peripheral device over the serial bus for presentation at the associated presentation times.

In yet another embodiment, the present invention provides a method for isochronously transporting A/V data in CIPs over a serial bus. Each CIP includes a header field and a data field. The header, in turn, includes a SYT field for storing a presentation time. The method includes: (a) copying CIP data into a set of CIP data fields; (b) generating CIP header values including SYT field values for each of the CIP header fields; (c) describing a set of full and empty CIPs for each of the CIPs for transmission over the serial bus; (d) sequentially transmitting the CIPs from a first CIP to a last CIP; (e) periodically generating an interrupt to copy new CIP data into the CIP fields from which the CIPs have been transmitted such that the new CIP data including new SYT field values are set up for transmission in advance; and (f) repeating the operation e) by looping from the last CIP to the first CIP when the last CIP has been transmitted.

The present invention advantageously provides a method and system for transmitting isochronous CIP data packets without substantial processor involvement. In particular, by reusing a generated DMA script program, the processor is freed from the highly processor-intensive task of repeatedly generating DMA script programs to transmit new CIP data packets. These and other advantages of the present invention will become apparent to those skilled in the art upon a study of the specification and drawings describing the present invention.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

The present invention will now be described in detail with reference to exemplary preferred embodiments as illustrated in the accompanying drawings. In the following description, numerous specific details are set forth in order to provide a thorough understanding of the present invention. It will be apparent, however, to one skilled in the art, that the present invention can be practiced without some or all of these specific details. In other instances, well known process steps have not been described in detail in order not to unnecessarily obscure the present invention.

The present invention provides a method and a system for transmitting isochronous A/V data packets over a serial bus. In addition, the method and system of the present invention generate and adjust synchronization time (SYT) field values and empty CIPs by reusing and modifying DMA script programs. The reuse of the DMA script programs for transporting isochronous A/V data packets requires less processor involvement and intervention, and thus requires substantially reduced processor time to implement than conventional methods and systems.

Figure 1:
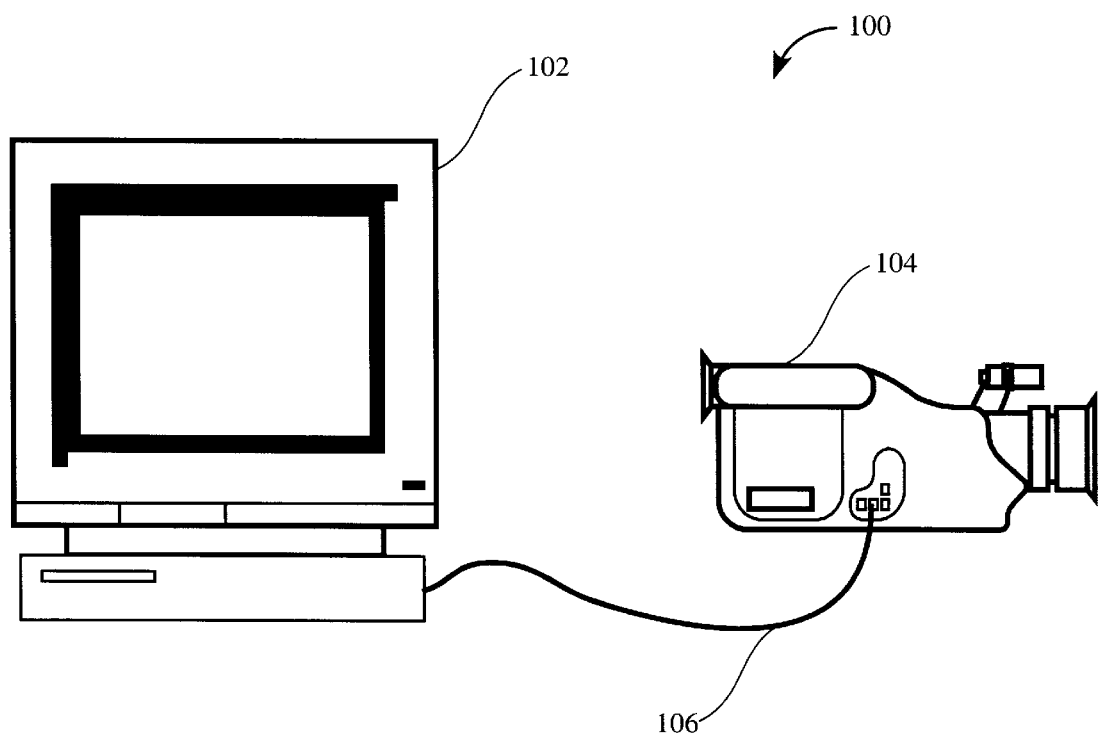
FIG. 1 shows a computer system including a host computer coupled to a camcorder.
Figure 2:
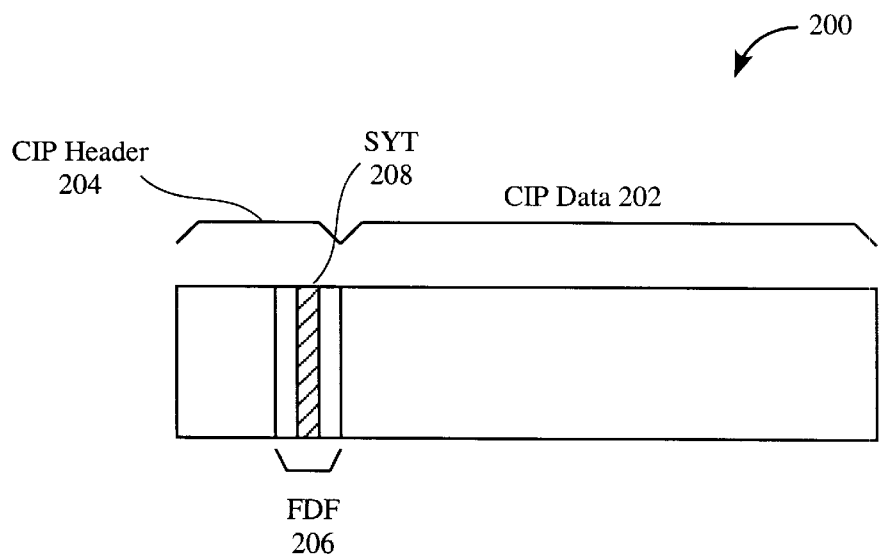
FIG. 2 illustrates a structure of a CIP data packet for transmitting audio and/or video (A/V) data over an IEEE 1394 serial bus.
Figure 3:
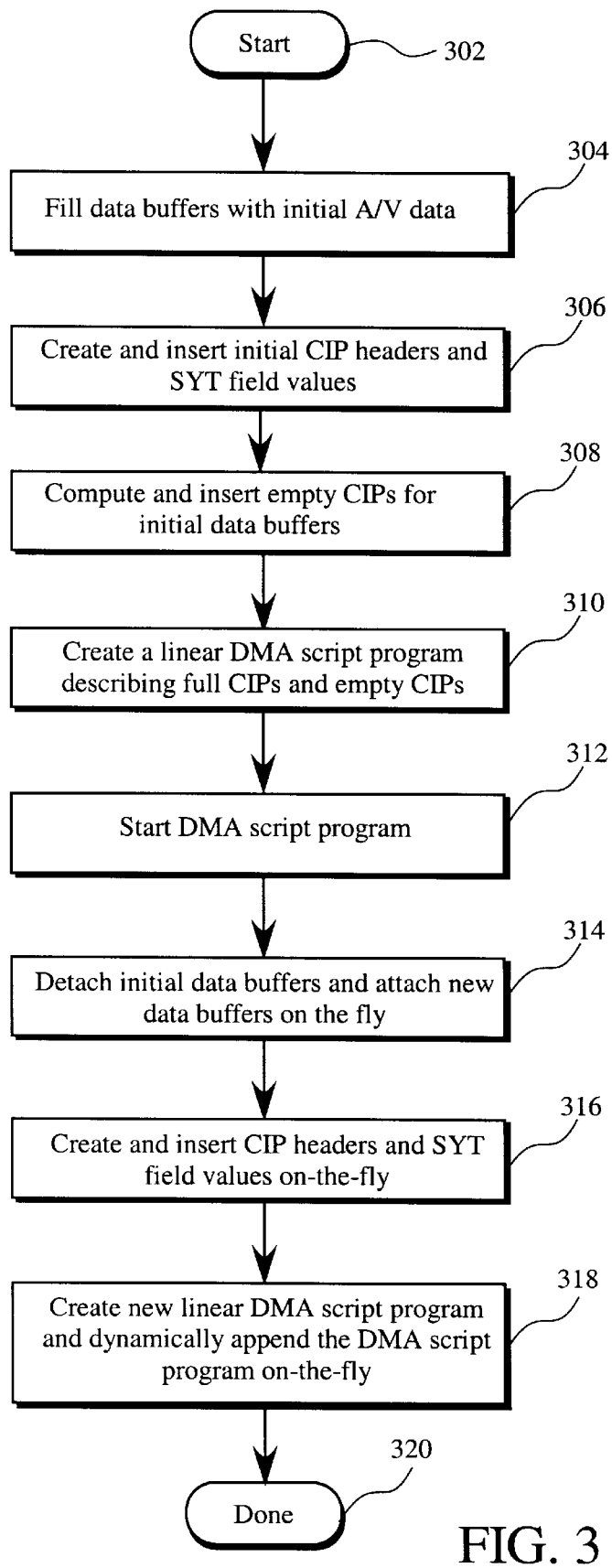
FIG. 3 illustrates a flowchart of a conventional method for creating DMA script programs for transmitting CIP data packets.
Figure 4:
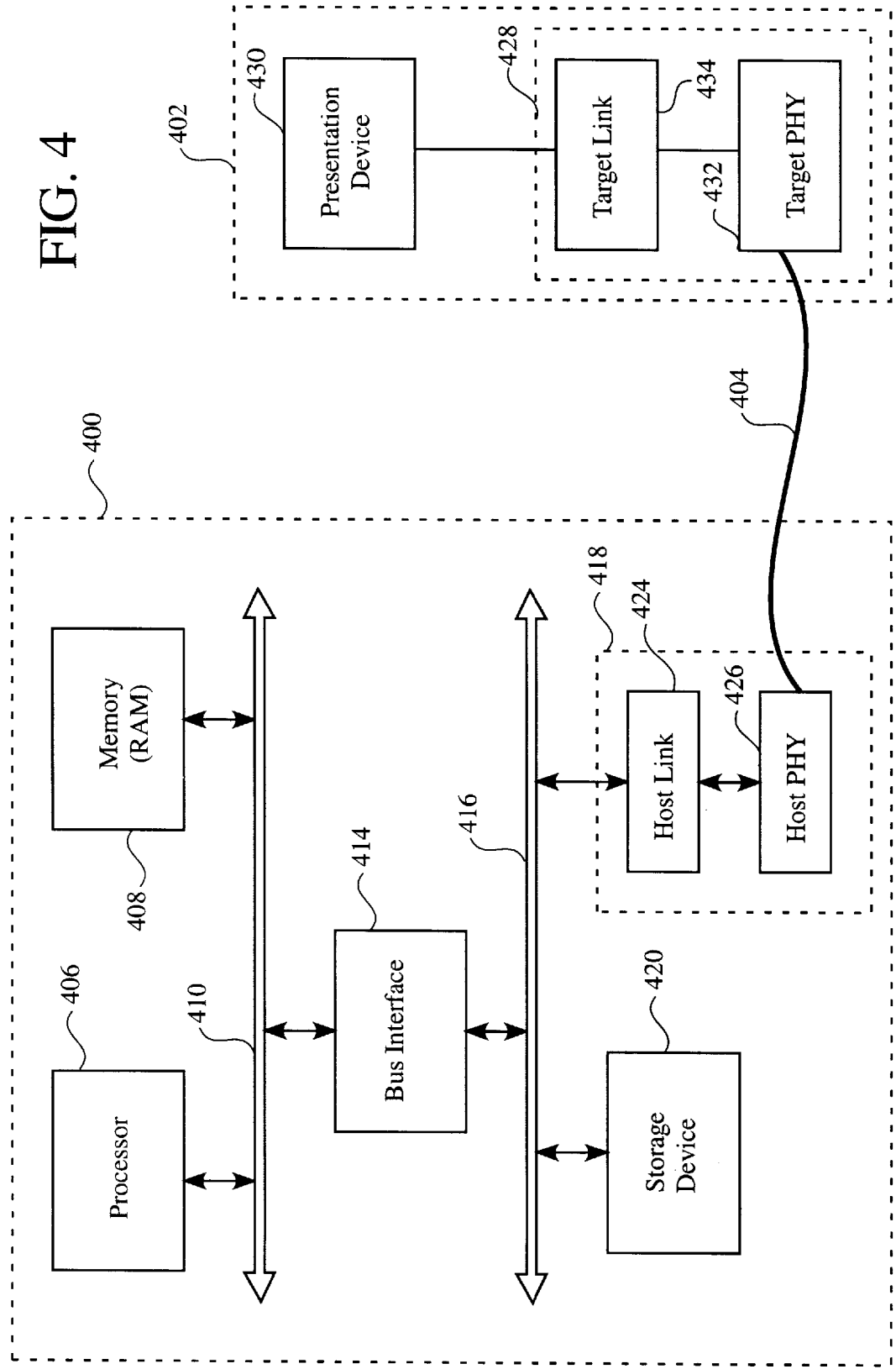
FIG. 4 illustrates an exemplary host computer system coupled to an exemplary A/V device through an IEEE 1394 serial bus.

FIG. 4 illustrates an exemplary host computer system 400 coupled to an exemplary A/V device 402 through an IEEE 1394 serial bus 404. The host computer system 400 includes a processor 406 and a memory 408 coupled to a system bus 410. The processor 406 processes information such as data and instructions received over the system bus 410. The memory 408 stores the data and instructions for use by the processor 406.

The host computer system 400 also includes a bus interface 414 for interfacing the system bus 410 with an I/O bus 416 (e.g., PCI bus, SCSI bus, ISA bus, etc.). The host computer system 400 further includes a storage device 420 and a host interface 418, which are coupled to the I/O bus 416. The storage device 420 may be any device suitable for storing information such as data and instructions, and includes devices such as hard disk, removable disk, floppy disk, optical disks, etc. The host interface 418 includes a host link 424 coupled to a host physical layer (PHY) 426. The host interface 418 is adapted to interface the computer system 400 with the A/V device 402 to transmit data packets over the 1394 bus 404.

With continuing reference to FIG. 4, the host computer system 400 and the A/V device 402 are connected through the 1394 serial bus 404. The A/V device 402 includes a target interface 428 and a presentation device 430. Like the host interface 418, the target interface 428 includes a target link 434 and a target PHY 432. The A/V device 402 may be any suitable audio and/or video device adapted to play or display audio and/or video data streams. For example, the A/V device 402 be any suitable consumer electronic devices such as digital camcorders, digital cameras, HD TVs, DVD players, DVD-ROM drives, CD players, CD-ROM drives, etc.

The presentation device 430 is coupled to the target interface 428 and is adapted to receive the A/V data and the presentation time for presenting the A/V data. As used herein, the terms "presenting" and "presentation" refer to playing audio and/or displaying video data. As such, the presentation device 430 may be a display device such as digital cameras, digital camcorders, TVs, VCRs, or an audio device for playing audio data.

The host and target PHYs 426 and 432 are coupled to the 1394 bus 404 to provide electrical and mechanical connections between the 1394 cable 404 and the interfaces 418 and 428. The host and target links 424 and 434, respectively, are adapted to handle low level 1394 transport. The host link 424 may be implemented by using any suitable host link chips such as the AIC 5800™ chip from Adaptec, Inc. of Milpitas, Calif. or a link chip described by the Open Host Controller Interface (OHCI) specification. The PHYs 426 and 432 are adapted to receive CIP packets and transmit them to the connected links 424 and 434, respectively. Accordingly, the PHYs 426 and 432 provides the physical interface while the links 424 and 434 handle the transport function. The A/V protocols are handled by the CPU through software.

In this arrangement, the host link 424 receives A/V data isochronously in the form of CIPs from the main memory 408. The host interface 418 and the target interface 428 together provide interface functions to enable the host computer system 400 and the peripheral A/V device 402 to communicate through the 1394 bus 404.

In accordance with preferred embodiments of the present invention, the computer system 400 creates and stores A/V data in CIP format in main memory 408. Since a dedicated memory unit in the host interface 418 is typically expensive to implement, using the existing main memory 408 allows a less complex host interface 418. Thus, the computer system 400 provides substantial savings in cost.

For high-bandwidth transfers of A/V data stream, the host computer system 400 utilizes well-known DMA techniques to transfer A/V data in CIP format from the memory 408 to the host link 424. The DMA method facilitates data transfer without substantial processor involvement. In DMA transactions, the attached I/O devices such as the host link 424 may read from and/or write to the main memory 408 without requiring substantial processor involvement. DMA techniques and devices are well known in the art and are often implemented in modem computer systems.

Figure 5:
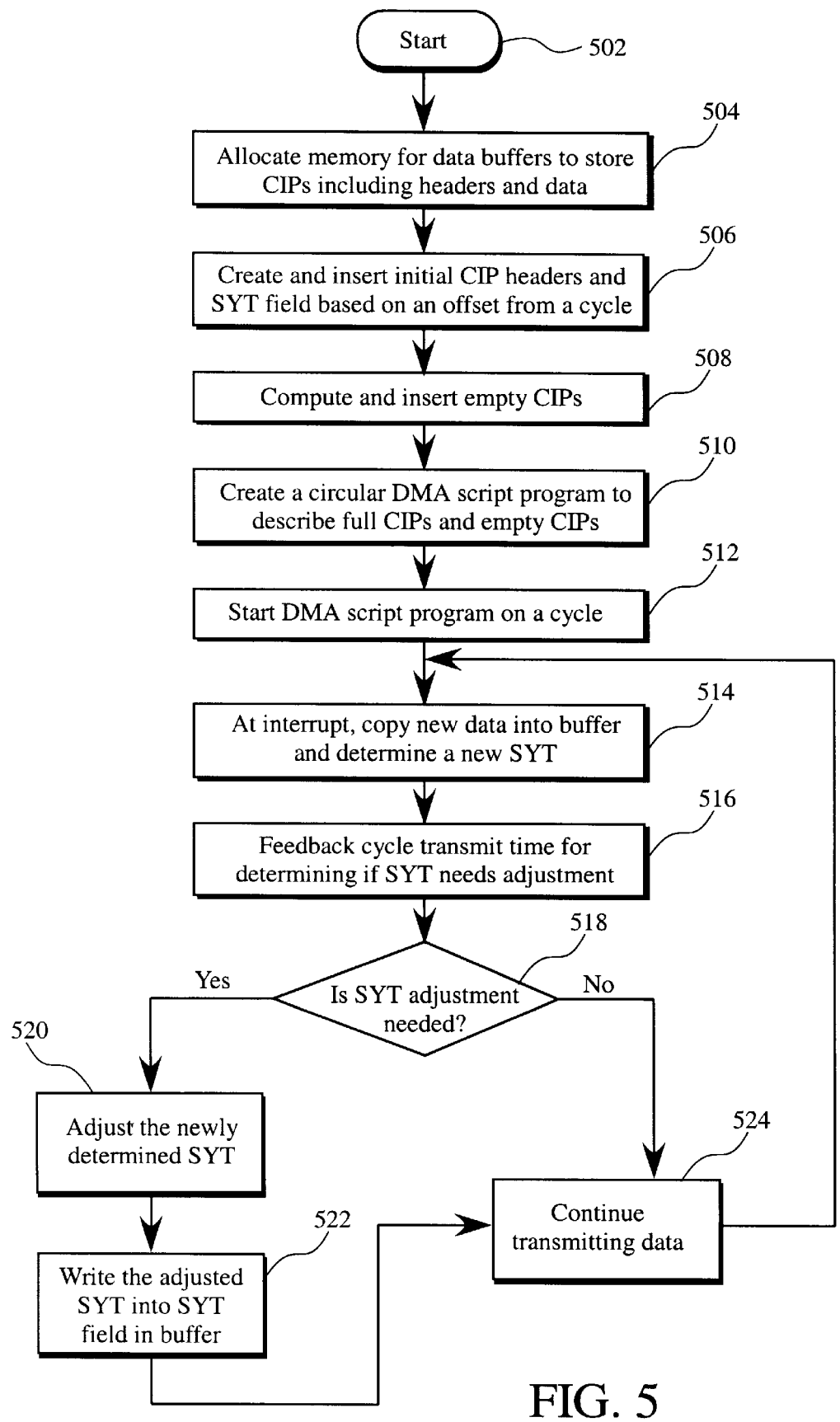
FIG. 5 illustrates an overview flowchart of an exemplary method for transmitting A/V data encapsulated in CIP packet format from the host computer to the remote A/V device.

FIG. 5 illustrates an overview flowchart of an exemplary method for transmitting A/V data encapsulated in CIP packet format from the host computer 400 to the remote A/V device 402. The method begins in operation 502 and proceeds to operation 504, where memory is allocated for data buffers to store CIPs including header and payload data. The allocated data buffer space will be used to copy the A/V data to be transmitted in advance of transmission. The buffers in the memory are configured as circular buffers arranged to loop in a circular format. Hence, the buffers form a circular list of buffers.

In operation 506, initial CIP headers and SYT field are created and inserted into the allocated memory buffers based on an offset from a cycle. The SYT field, representing the presentation time of the A/V data, is computed initially and inserted into the CIP headers in the associated buffer. In one embodiment, the initial SYT fields may be computed based on an offset from the starting transmit time, which is the difference between the transmit time and the presentation time.

After creating and inserting initial CIP headers and SYT fields, empty CIPs are created and inserted, in operation 508, to reduce the transmission rate of the A/V data such that the SYT field values match the presentation time. The empty CIPs preferably contain the same data as the next CIP header to be transmitted. Thus, it is only necessary to determine when to insert one or more empty CIPs into the data stream.

Then in operation 510, a circular DMA script program is created. The circular DMA script program describes how the fill CIP data packets and empty CIPs are to be transmitted over a 1394 bus to the A/V device. After the creation of the circular DMA script program, the created DMA script program is started on a cycle in operation 512. Preferably, the starting cycle is the cycle on which the transmit cycle value was used in determining the initial SYT fields for the CIP headers.

The DMA script program is executed until an interrupt is encountered in operation 514. The interrupt causes the processor to copy new data into a buffer and to determine a new SYT value for the buffer. Then in operation 516, cycle transmit time is fedback for determining whether the SYT needs adjustment. In operation 518, it is determined if SYT adjustment is needed. If so, the method proceeds to operation 520, where the newly determined SYT value is adjusted to a new SYT value. Then, the adjusted SYT value is written into the SYT field in the buffer in operation 522. The method then proceeds to operation 524 to continue transmitting the CIP data. On the other hand, if SYT does not need to be adjusted in operation 518, the method proceeds directly to operation 524 to continue transmitting the CIP data. The method then proceeds back to operation 514, where new data is copied into buffer and a new SYT value is determined when an interrupt is encountered.

Figure 6A:
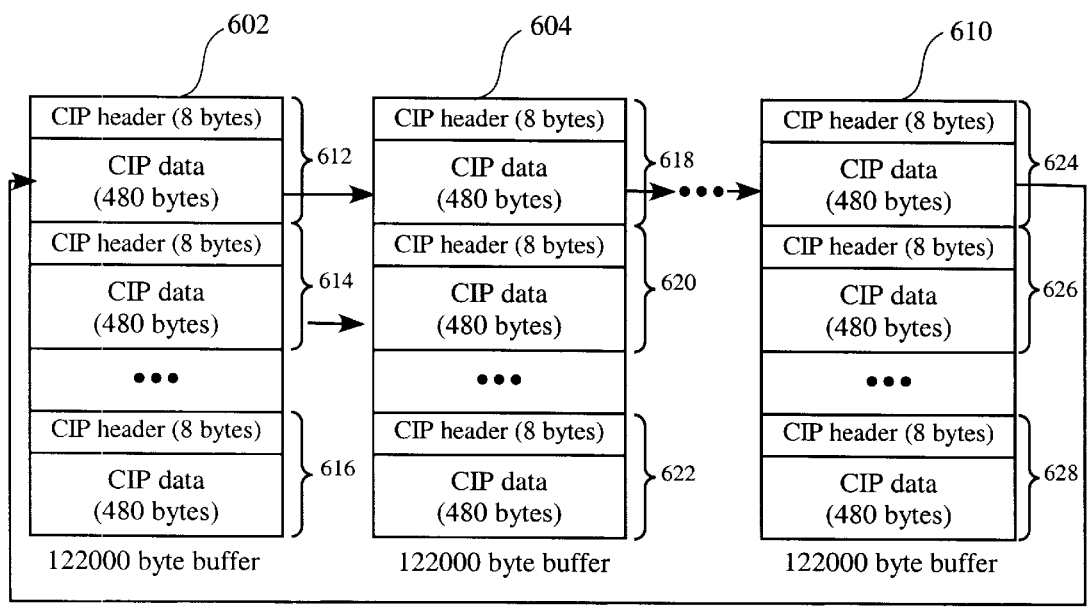
FIG. 6A shows a more detailed schematic diagram of exemplary buffers in accordance with one embodiment of the present invention.

FIG. 6A shows a more detailed schematic diagram of exemplary buffers in accordance with one embodiment of the present invention. In FIG. 6A, the buffers are created in the main memory 408 of the host computer system 400 by allocating a plurality of memory buffers 602, 604, and 610. Each of the buffers 602 through 610 is arranged to hold a block of data. For example, in the case of digital video data, each of the buffers 602 through 610 may be allocated sufficient space to store a frame of data. A preferred embodiment uses ten buffers to store ten frames of digital video data. For audio data, a smaller number of buffers and block sizes may be used instead. It is contemplated, however, that any number of buffers may be allocated within the confines of memory limitations.

Each of the buffers 602 through 610 in the circular chain is capable of storing a plurality of CIP data packets for transmission. The buffer 602, for example, is allocated to hold a plurality of CIP data packets 612 through 616. Similarly, the buffer 604 is arranged to store a plurality of CIP data packets 618 though 622. Likewise, the buffer 610 is configured to contain a plurality of CIP data packets 624 though 628. Each of the CIP packets 612 through 628 in the memory is capable of holding a CIP header field of eight bytes and a CIP data field of 480 bytes.

The allocated buffers in the memory are preferably sufficiently large to accommodate a worst case application and operation system latency. For example, in the case of NTSC digital video data transmission, each frame of digital video data is comprised of 120,000 bytes. Since a CIP packet comprises 488 bytes, storing a frame of digital video data requires a buffer of 122,000-byte size. Furthermore, to handle a worst case application or operating system latency of ⅓ second, ten buffers are needed to accommodate the 122,000-byte frame based on 29.97 frames per second rate. Since a CIP data packet contains 480 bytes of data, a data rate of approximately 3.6 Megabytes per second is required to properly display the video data.

However, given that a CIP data packet is transmitted every 125 $\mu$s or 8,000 cycles per second in an isochronous transaction, transmitting full CIPs at all times yields a data rate of about 3.84 Megabytes per second. This data rate is well in excess of the proper data rate of 3.6 Megabytes per second and thus may cause substantial jitter upon display. Accordingly, the present invention adjusts the data rate of isochronous transactions so as to bring the actual data transmission rate to within a predetermined range of the proper data rate. Preferably, the predetermined range of the proper data rate is determined such that jitter is substantially eliminated during the presentation of the data.

After allocating the buffers, initial set of CIP headers including the SYT field values are created and inserted into the corresponding CIP header and SYT fields in each of the buffers. In accordance with one embodiment, CIP headers including SYT fields are created to described for a ⅓ of a second, which requires about 10 frames for digital video data. It should be appreciated, however, that the CIP headers may be created for any suitable number of frames. The CIP data are also inserted into the CIP data fields after the allocation of the buffers in the memory.

Figure 6B:
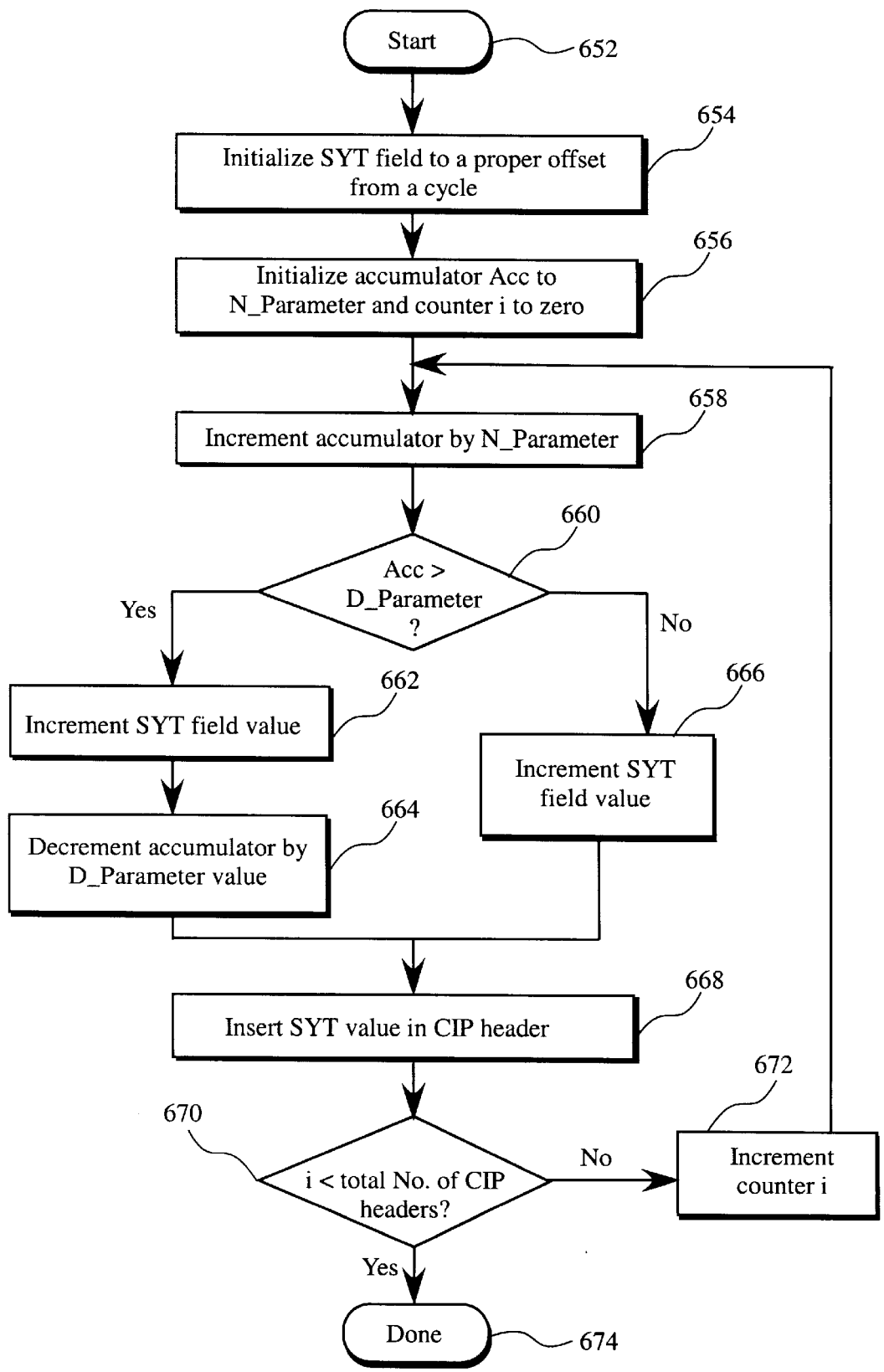
FIG. 6B shows a more detailed flow chart of a method for creating and inserting SYT field values into a buffer in accordance with one embodiment of the present invention.

FIG. 6B shows a more detailed flow chart of a method for creating and inserting SYT field values into a buffer in accordance with one embodiment of the present invention. The method begins in operation 652 and proceeds to operation 654, where SYT field value is initialized to a proper offset from a cycle. The offset from a cycle is defined as the difference between a transmit time and a presentation time. The transmit time refers to the time a CIP is transmitted from the host computer system onto a 1394 bus. On the other hand, the presentation time corresponds to the time the CIP is actually presented at a peripheral or remote device coupled to the host computer system by means of a 1394 bus.

Then an accumulator Acc is initialized to a value N_Parameter while a counter variable i is initialized to zero in operation 656. The value N_Parameter represents a numerator N in an algorithm (I+N/D), where I is a base value and N and D are numerator and denominator, respectively. This algorithm is well known in the art and is used herein to compute SYT field values. The base value I is represented herein as I_SYT, which is a base value used in incrementing the current SYT field value for the next CIP header. In addition, the denominator D is represented as D_Parameter. The N_Parameter and the D_Parameter define a fraction, which is used to determine how to increment the current SYT field value for the next CIP header. The N_Parameter, D_Parameter, and I_SYT may be initially any suitable number to properly determine SYT field values. For example, in the case of NTSC digital video data, I_SYT, N_Parameter, and D_Parameter may be b34h, b34h, and 23028h, respectively, where h denotes hexadecimal format.

Applying the algorithm, it is determined, in operation 660, if the accumulator value is greater than D_Parameter value. If so, the SYT field value is incremented, preferably by one, in operation 662. Then, the accumulator value is decremented by D_Parameter in operation 664. On the other hand, if the accumulator value is not greater than D_Parameter value in operation 660, the SYT value is incremented, preferably by one.

The method then proceeds to operation 668, where the new SYT value is inserted into an associated CIP header field in an associated buffer. Then in operation 670, it is determined if the counter i value is less than the total number of CIP headers in a buffer. For example, a buffer may contain 8,000 CIPs and associated headers in an isochronous transaction. If it is determined that the counter value is not less than the total number of CIP headers, the counter i is incremented, preferably by one, in operation 672. The method then proceeds back to operation 658 to compute SYT field value for the next CIP data packet. If however, the value of the counter i is less than the total number of CIP headers in a buffer, SYT values for all CIP headers have been computed and the method terminates in operation 674.

When the SYT values for all CIP data packets have been created and inserted, empty CIP data packets are computed and inserted into the buffer to produce a proper data rate. For example, the expected data rate of an A/V device receiving digital video data is about 7,493 cycles per second based on transmission of 120,000 bytes per frame for 29.97 frames per second. In this case, empty CIPs need to be inserted at a ratio of one empty CIP per 14.76 full CIPs to bring down the data rate to the expected data rate. In one embodiment, empty CIPs contain the same data as the next CIP to be transmitted. In such a case, the DMA script program need only describe when to insert the empty CIPs into the data stream.

Figure 6C:
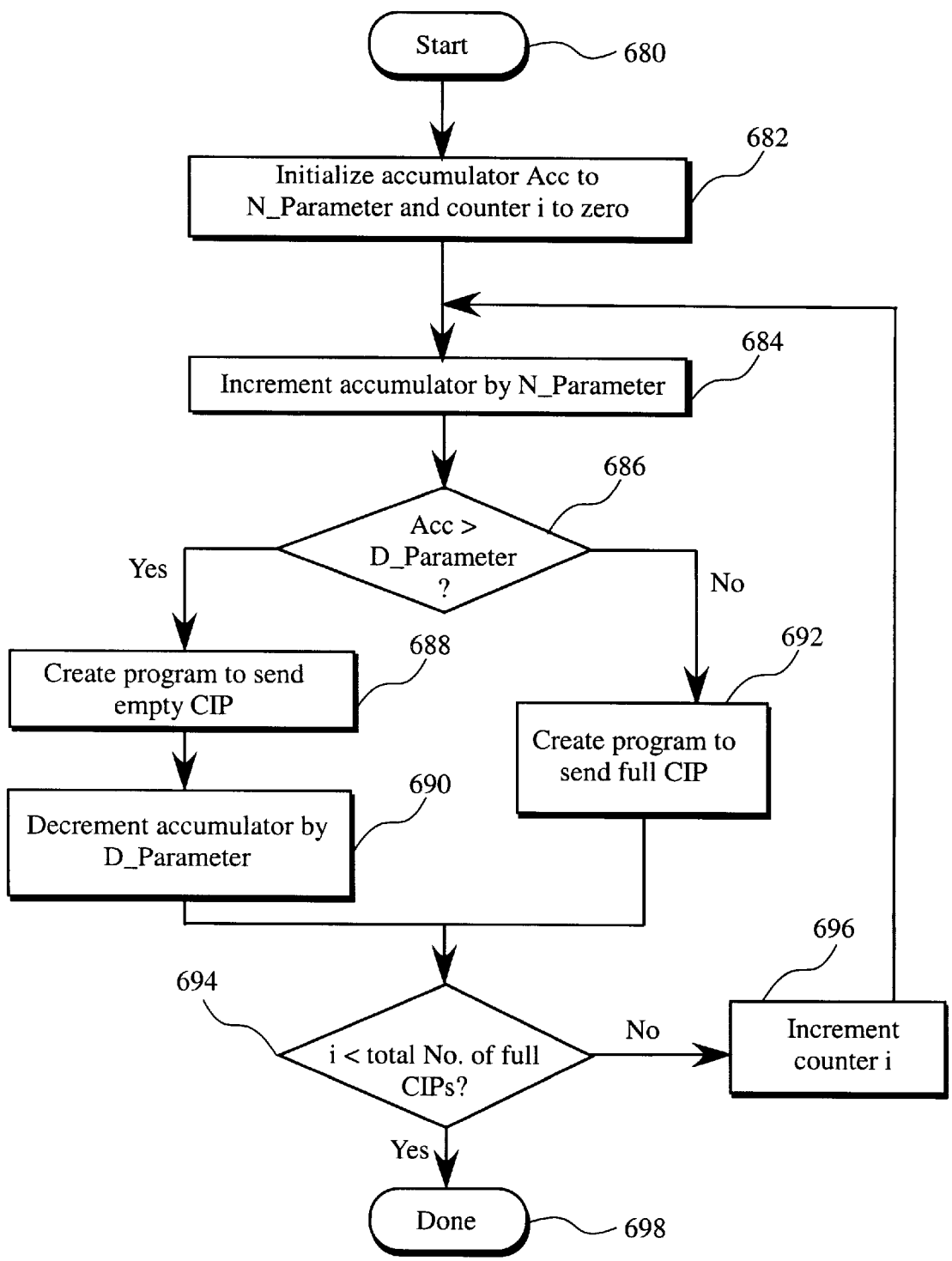
FIG. 6C shows a more detailed flow chart of a method for creating and inserting empty CIPs.

FIG. 6C shows a more detailed flow chart of a method for creating and inserting empty CIPs. The method begins in operation 680 and proceeds to operation 682, where accumulator Acc is initialized to N_Parameter and the counter i is set to zero. Then in operation 684, the accumulator value is incremented by N_Parameter.

Next in operation 686, it is determined if the accumulator value is greater than D_Parameter. If so, a program is created to send an empty CIP for a first CIP (i.e., i=0) in a buffer in operation 688. Then, the accumulator Acc is decremented by D_Parameter in operation 690. However, if the accumulator value in operation 686 is not greater than D_Parameter, then a program is created to send a full CIP for the first CIP (e.g., i=0) in operation 692.

The method then proceeds to operation 694, where it is determined if the value of the counter i is less than the total number of full CIPs in a buffer. For example, the value of the counter i may range from 0 to 7,999, where a full buffer contains 8,000 CIPs. If the counter value is not less than the total number of full CIPs, the counter i is incremented, preferably by one, in operation 696. The method then proceeds to back to operation 684 to determine whether to send an empty or a full CIP data packet for the next CIP in the buffer. However, if the counter i is less than the total number of full CIPs in a buffer, this means that all CIPs in the buffer have been processed. Accordingly, the method terminates in operation 698. The methods of FIGS. 6B and 6C may be repeated until CIPs have been created and inserted in all buffers.

Figure 7A:
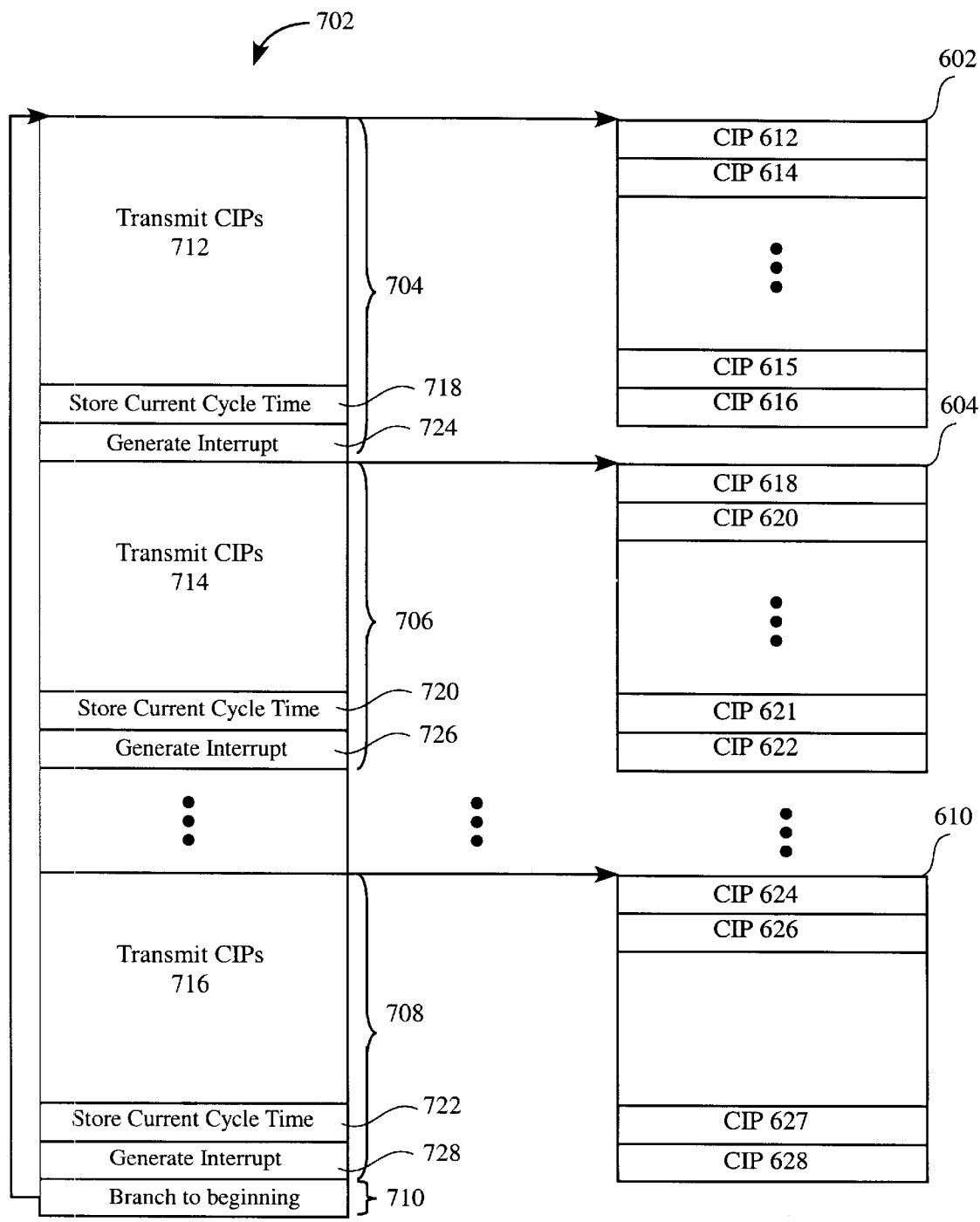
FIG. 7A illustrates a schematic diagram of an exemplary DMA script program describing how the full and empty CIPs in a plurality of buffers are to be transmitted over a 1394 bus.

Upon creation and insertion of empty and full CIPs, a circular DMA script program is created to describe the full and empty CIPs in all the buffers based on the methods illustrated in FIGS. 6B and 6C. FIG. 7A illustrates a schematic diagram of an exemplary DMA script program 702 describing how the full and empty CIPs in the buffers 602 through 610 are to be transmitted over a 1394 bus. The DMA script program 702 is arranged in units of frames 704, 706, and 708 corresponding to the buffers 602, 604, and 610, respectively. Each of the script program frames 704 through 708 of the DMA script program is further divided into three program blocks: transmit-CIPs blocks 712, 714, and 716, store-current-cycle-time blocks 718, 720, and 722, and generate-interrupt blocks 724, 726, and 728. As will be discussed in more detail below, the transmit-CIPs blocks 712 through 716 include DMA script programs for sending out full or empty CIPs. The store current-cycle-time blocks 718 through 722 include a DMA script program for storing the current cycle time of the serial bus-transmission time. On the other hand, the generate-interrupt blocks 724 through 728 include a DMA script program for generating an interrupt to a processor (e.g., host processor 406) after transmitting all CIPs in an associated buffer and storing the current cycle time. In addition, the DMA script program 702 includes a branch instruction 710 to loop back to the beginning of the DMA script program in the frame 704. The branch back to the beginning allows the existing DMA script program 702 to be reused in transmitting a new set of data, thereby significantly reducing the load on the processor (e.g., host processor 406).

The DMA script program 702 is arranged in a circular manner to implement a circular buffer. Specifically, the DMA script programs in the transmit-CIP program blocks 712 through 716 are configured to point to the corresponding CIP locations in the associated buffer 602 through 610. After sending all CIPs in the buffer 602, the DMA script program stores current cycle time and then generates an interrupt to the processor. As will be discussed in more detail below, the processor performs a number of tasks in response to the interrupt including generating new SYT field values and adjusting them for proper data rate. The DMA script program 702 performs the same tasks sequentially for all the frames 704 through 708. After processing the last frame 708, the DMA script program jumps back to the beginning of the DMA script program.

The mapping of the DMA script program 702 to the buffers 602 through 610 and the branching back to the beginning of the DMA script program 702 effectively operate to form a circular chain of buffers 602 thorough 610. In this arrangement, the DMA script program causes the CIP data packets to be transmitted in sequence through the buffers 602 through 610. For instance, the CIPs of the first buffer 602 are transmitted before the CIPs of the second buffer 604, and so on. When the CIPs of a buffer have been transmitted, the interrupt generated by the DMA script program causes new CIP data and SYT values to be inserted into the buffer that has transmitted its CIPs. In this manner, the circular DMA script program continually transmits CIPs in the buffers while ensuring that the transmitted CIPs are replaced with new CIP data using only a specified number of buffers.

Figure 7B:
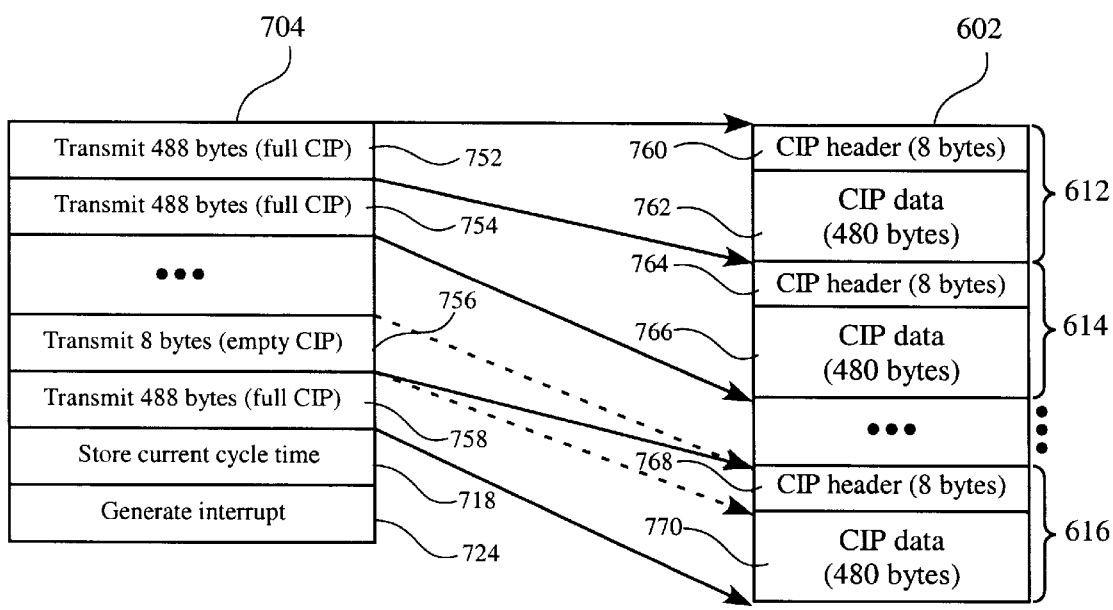
FIG. 7B shows a more detailed relationship between an exemplary frame of the DMA script program and the associated buffer.

FIG. 7B shows a more detailed relationship between the exemplary frame 704 of the DMA script program 702 and the associated buffer 602. The CIP data packets 612 through 616 include an 8-byte CIP header and a 480-byte CIP data. For example, the CIP data packets 612, 614, and 616 include CIP header 760, 764, and 768, respectively, and CIP data 762, 766, and 770, respectively. In the illustrated example, the CIP data packets 612, 614, and 616 are full data packets.

In addition to the store-current-cycle-time block 718 and the generate-interrupt block 724, the DMA script program for the buffer 602 includes a plurality of DMA script program blocks 752, 754, 756, and 758 for the CIP data packets 612 through 616. One DMA script program block is associated with one CIP data packet in the buffer 602. Each of the DMA script program blocks 752 though 758 is adapted to transmit an associated CIP data packet. For example, DMA script program blocks 752, 754, and 758 are configured to transmit full CIP data packets 612, 614, and 616, respectively. On the other hand, the DMA script program block 756 is configured to transmit an empty CIP. As mentioned previously, the empty CIP is preferably transmitted by transmitting the same data as the next CIP header 768. In other embodiments, however, it is contemplated that the empty CIP may be transmitted by sending any CIP data packet adapted to reduce the data transmission rate.

After the DMA script program 702 has been created to describe full and empty CIPs, the DMA script program 702 is run. Specifically, the DMA script program 702 is started on a transmit cycle that was used in computing the initial SYT field values for the CIP headers. Once the DMA script program 702 executes, an interrupt is generated periodically after the transmission of an entire buffer to allow copying of new data to be transmitted and updating of CIP headers on-the-fly. In particular, the CIP headers and SYT fields in each individual data buffer are re-computed and updated before the DMA script program 702 loops back to re-transmit the data buffer.

Figure 8:
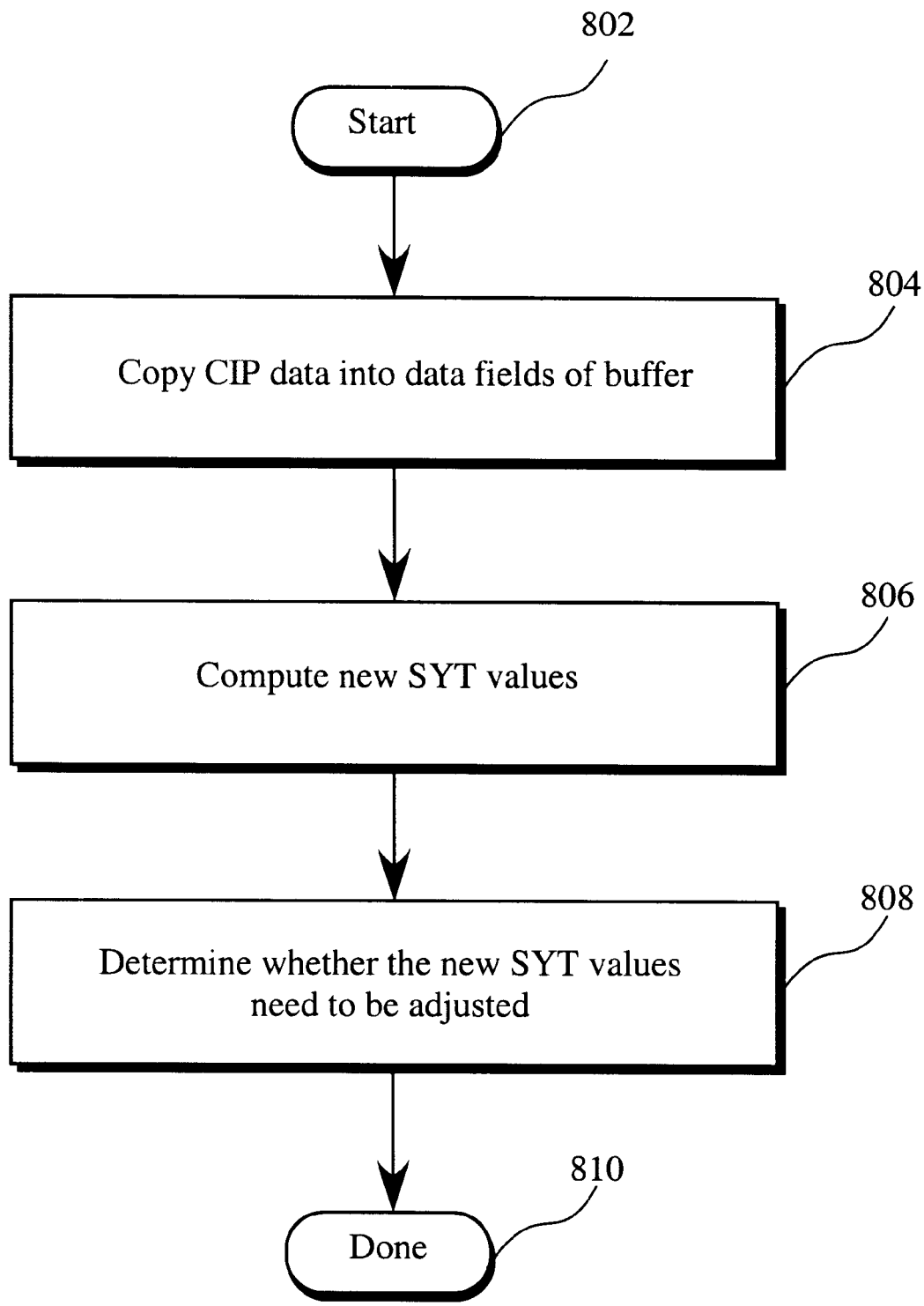
FIG. 8 illustrates an exemplary method performed when an interrupt is generated after transmitting CIP data packets in a buffer.

FIG. 8 illustrates an exemplary method performed when the interrupt is generated after transmitting CIP data packets in a buffer. The method begins in operation 802 and proceeds to operation 804, where new CIP data are copied into CIP data fields of the buffer. Then in operation 806, new SYT field values are calculated for the CIP data packets in the buffer. The SYT field is recalculated using the preferred method described in FIGS. 6B and 6C. In operation 808, it is determined whether the data rate needs to be adjusted by determining whether the new SYT values need to be adjusted. The method then terminates in operation 810.

In accordance with a preferred embodiment, the DMA script program 702 and the empty CIPs are generated only before starting the DMA script program itself. As a result, only the data and CIP headers are updated on-the-fly through the use of the interrupts as described above. The generated DMA program is then used repeatedly as needed to transmit subsequent data, thereby significantly reducing CPU overhead for CIP based data transmission.

As the circular DMA script program is processed, a slight mismatch of the data rates and presentation times may occur because the computed empty CIPs may not be entirely accurate for subsequent transmission of CIP data. In addition, the SYT field values may drift since they are closely tied to the empty CIP calculation algorithm illustrated in FIGS. 6B and 6C. This may cause the data rate to move away from the data rate expected by an A/V device. Consequently, the data rate may not exactly match the expected data rate of an A/V device.

In one embodiment, the present invention employs a feedback of actual transmit time to prevent the data rate and the SYT field values from drifting. As noted above, the DMA script program 702 stores the current cycle time, which represents the "transmit time" of the CIP based data. When updating the SYT field in the CIP headers through the use of the SYT calculation algorithm illustrated in FIG. 6B, the newly computed SYT field value is compared with the last "transmit time," which has been stored previously. Generally, the newly computed SYT field value will be within a couple cycles of the initial computed transmit time to presentation time offset.

Figure 9:
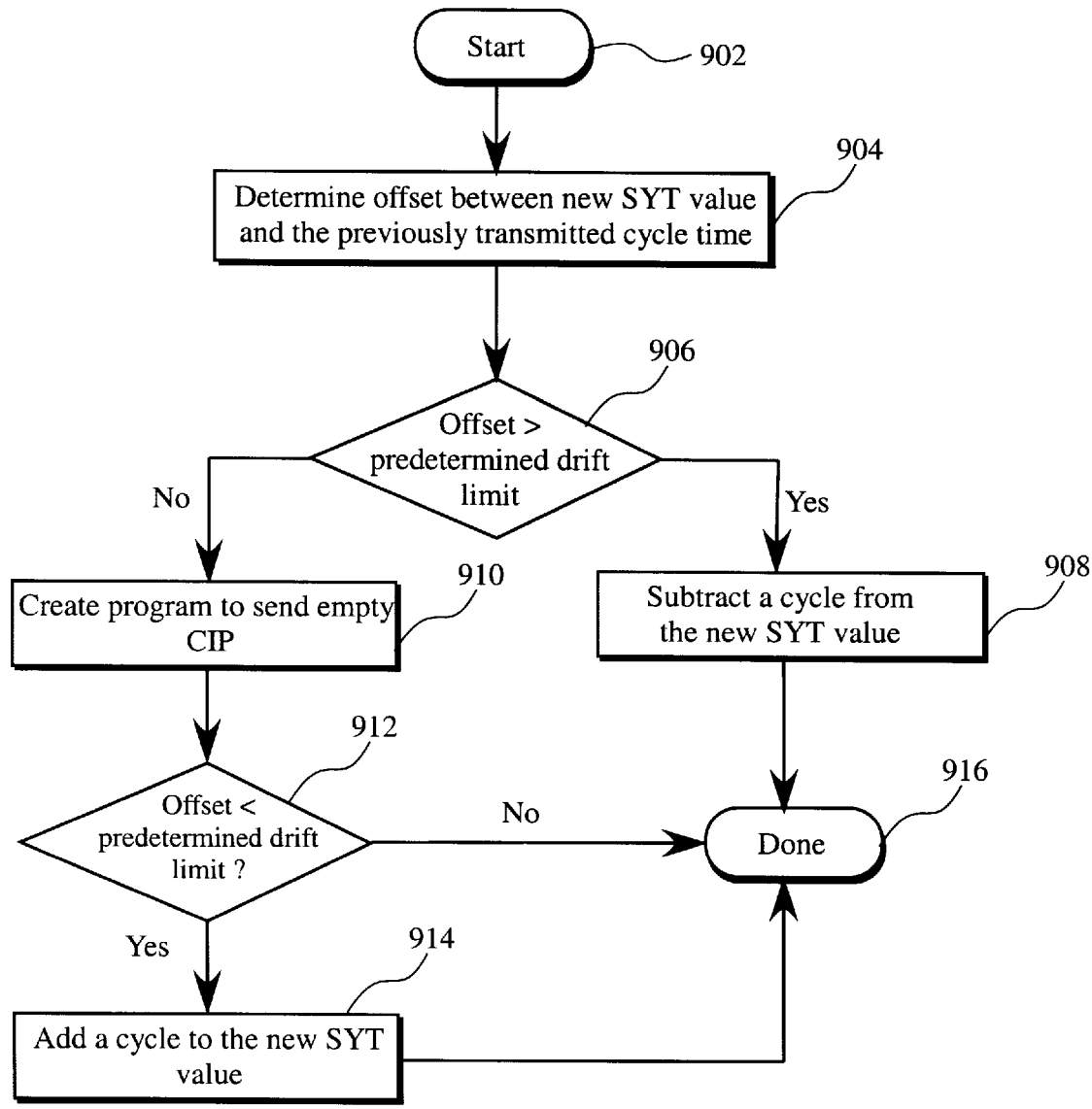
FIG. 9 illustrates a more detailed flowchart of an exemplary method for adjusting SYT field values by feedback of cycle transmit time.

FIG. 9 illustrates a more detailed flowchart of an exemplary method for adjusting SYT field values by feedback of cycle transmit time. The method begins in operation 902 and proceeds to operation 904, where an offset is determined between new SYT value and the previously transmitted cycle time. Then in operation 906, it is determined if the offset is greater than a predetermined drift limit. For digital video data, the predetermined drift limit may be set to within plus or minus one cycle of about 14 cycles to substantially eliminate jitter effect. That is, the predetermined drift limit can be set between 13 and 15 cycles. Those skilled in the art will appreciate that other drift limits may also be established to reduce jitter effect to a desired degree.

If the offset is greater than the predetermined drift limit, then a cycle is subtracted from the new SYT value in operation 908. This has the effect of speeding up the data rate. On the other hand, if the offset is not greater than the predetermined drift limit, then a DMA script program is created to send an empty CIP. Then in operation 912, it is determined if the offset is less than the predetermined drift limit. If yes, a cycle is added to the newly computed SYT value so as to reduce the data rate. Otherwise, the offset is within the predetermined drift limit so that no adjustment is necessary. The method then terminates in operation 916.

The present invention thus provides a method and system for transmitting isochronous CIP data packets without substantial processor involvement. For example, by reusing a generated DMA script program, the processor is freed from the highly processor-intensive task of repeatedly generating DMA script programs to transmit new CIP data packets. In addition, the reuse of the existing DMA script program allows calculation of empty and full CIPs only once. Thereafter, only the SYT values are adjusted to transmit the CIP data packets to obtain a desired data rate.

While this invention has been described in terms of several preferred embodiments, there are alterations, permutations, and equivalents which fall within the scope of this invention. For example, the method and system of the present invention can be applied to other non-1394 standard cables and/or data transferring systems. It should also be noted that there are alternative ways of implementing both the method and system of the present invention. It is therefore intended that the following appended claims be interpreted as including all such alterations, permutations, and equivalents as fall within the true spirit and scope of the present invention.

What is claimed is:

1. A method for isochronously transporting audio and/or video (A/V) data in common isochronous packets (CIPs) over a serial bus, comprising:

allocating a memory space for a set of buffers to store a plurality of CIPs, each of the CIPs having a header field and a data field, the header field having a synchronization time (SYT) field for storing a presentation time;

generating initial CIP header values including initial SYT field values for each of the CIP header fields in the set of buffers;

generating a circular DMA script program configured to describe a set of full and empty CIPs for each of the buffers, the circular DMA script program being configured to transmit the CIPs from the buffers;

running the DMA script program to sequentially transmit the CIPs from the buffers by traversing the buffers in a circular manner, the transmitted CIPs being presented at the associated presentation time; and periodically generating an interrupt, by the DMA script program, to copy new CIP data into the CIP fields of buffers from which the CIPs have been transmitted such that the new CIP data including new SYT field values are set up for transmission in advance.

2. The method as recited in claim 1, wherein the operation of generating the initial CIP header values further includes:

initializing the initial SYT field values to an offset from a cycle that is defined by a difference between a transmit time and a presentation time of the associated CIPs; and sequentially determining the initial SYT field values of the associated CIPs by sequentially incrementing the initial SYT field values.

3. The method as recited in claim 2, wherein the operation of generating the initial CIP header values further includes:

inserting the generated initial CIP header values including the initial SYT field values into the corresponding fields in the buffers.

4. The method as recited in claim 1, wherein the DMA script program transmits an empty CIP by transmitting the data for the next CIP.

5. The method as recited in claim 1, wherein the operation of generating the circular DMA script program for the buffers includes:

creating a program to transmit the full CIPs; and creating a program to transmit the empty CIPs periodically to obtain a specified data rate.

6. The method as recited in claim 5, wherein the operation of generating the circular DMA script program for the buffers further includes:

generating a program to store a current cycle time for each buffer; and generating a program to cause an interrupt after transmitting CIPs for each buffer.

7. The method as recited in claim 2, wherein the DMA script program is run by starting the DMA script program at the transmit time.

8. The method as recited in claim 6, further comprising:

feeding back the cycle transmit time; and adjusting the new SYT field values in response to the cycle transmit time to obtain a desired data rate.

9. The method as recited in claim 5, wherein the operation of generating the interrupt includes:

copying the new CIP data into the CIP data fields of the buffers from which the CIPs have been transmitted; and computing new CIP header values including the new SYT field values.

10. The method as recited in claim 8, wherein the operation of generating the interrupt further includes:

adjusting the new SYT field values to obtain a desired data rate.

11. The method as recited in claim 10, wherein the operation of adjusting the new SYT field values includes:

determining a difference between the new SYT values and a previously transmitted cycle time;

determining if the difference is within a predetermined drift range; and if the difference is not greater than the predetermined drift range, creating a program to transmit an empty CIP for the CIP associated with the new SYT field; and if the difference is greater than the predetermined drift range, subtracting a cycle from the new SYT value.

12. The method as recited in claim 11, wherein the operation of adjusting the new SYT field values further includes:

if the difference is less than the predetermined drift range, adding a cycle to the new SYT value.

13. The method as recited in claim 1, wherein serial bus is an IEEE 1394 bus.

14. The method as recited in claim 1, wherein the A/V data is isochronously transmitted over the serial bus to an A/V device for presentation.

15. A computer system for isochronously transporting audio and/or video (A/V) data in common isochronous packets (CIPs) over a serial bus, the system comprising:

a main memory coupled to a bus and being configured as a set of buffers to store a plurality of CIPs, each of the CIPs having a header field and a data field, the header field having a synchronization time (SYT) field for storing a presentation time;

a processor coupled to the bus to generate initial CIP header values including initial SYT field values for each of the CIP header fields in the set of buffers, the processor generating a circular DMA script program that describes a set of full and empty CIPs for each of the buffers, the circular DMA script program being configured to transmit the CIPs from the buffers; and a host interface coupled to the bus and including a host link device and a PHY device, the host interface being configured to receive and transmit the CIPs from the buffers to a peripheral device over the serial bus for presentation at the associated presentation times.

16. The system as recited in claim 15, wherein the DMA script program is executed to sequentially transmit the CIPs from the buffers by traversing the buffers in a circular manner.

17. The system as recited in claim 16, wherein the DMA script periodically generates an interrupt to the processor, wherein the processor copies new CIP data into the CIP fields of the buffers from which the CIPs have been transmitted such that the new CIP data including new SYT field values are set up for transmission in advance.

18. The system as recited in claim 15, wherein the processor generates the initial CIP header values by:

initializing the initial SYT field values to an offset from a cycle that is defined by a difference between a transmit time and a presentation time of the associated CIPs; and sequentially determining the initial SYT field values of the associated CIPs by sequentially incrementing the initial SYT field values.

19. The system as recited in claim 18, wherein the processor inserts the generated initial CIP header values including the initial SYT field values into the corresponding fields in the buffers.

20. The system as recited in claim 15, wherein the DMA script program transmits the empty CIPs by transmitting the data for the next respective CIPs.

21. The system as recited in claim 17, wherein the processor generates the circular DMA script program for the buffers by:

creating a program to transmit the full CIPs; and creating a program to transmit the empty CIPs periodically to obtain a specified data rate.

22. The system as recited in claim 21, wherein the processor generates a program to store a current cycle time for each buffer and further generates a program to cause an interrupt after transmitting CIPs for each buffer.

23. The system as recited in claim 22, wherein the cycle transmit time is fed back and used in adjusting the new SYT field values to obtain a desired data rate.

24. The system as recited in claim 17, wherein the processor, in response to the interrupt, copies the new CIP data into the CIP data fields of the buffers from which the CIPs have been transmitted and computes new CIP header values including the new SYT field values.

25. The system as recited in claim 24, wherein the processor adjusts one or more new SYT field values to obtain a desired data rate.

26. The system as recited in claim 25, wherein the processor adjusts the new SYT field values by:

determining a difference between the new SYT values and a previously transmitted cycle time;

determining if the difference is within a predetermined drift range; and if the difference is not greater than the predetermined drift range, creating a program to transmit an empty CIP for the CIP associated with the new SYT field; and if the difference is greater than the predetermined drift range, subtracting a cycle from the new SYT value.

27. The system as recited in claim 26, wherein the processor adds a cycle to the new SYT value if the difference is less than the predetermined drift range.

28. The system as recited in claim 15, wherein serial bus is an IEEE 1394 bus.

29. A method for isochronously transporting audio and/or video (A/V) data in common isochronous packets (CIPs) over a serial bus, each CIP including a header field and a data field, the header having a synchronization time (SYT) field for storing a presentation time, the method comprising:

a) copying CIP data into a set of CIP data fields;

b) generating CIP header values including SYT field values for each of the CIP header fields;

c) describing a set of full and empty CIPs for each of the CIPs for transmission over the serial bus;

d) sequentially transmitting the CIPs from a first CIP to a last CIP;

e) periodically generating an interrupt to copy new CIP data into the CIP fields from which the CIPs have been transmitted such that the new CIP data including new SYT field values are set up for transmission in advance; and f) repeating operation e) by looping from the last CIP to the first CIP when the last CIP has been transmitted.

30. The method as recited in claim 29, wherein the operation b) further includes:

initializing the SYT field values to an offset from a cycle that is defined by a difference between a transmit time and a presentation time of the associated CIPs;

sequentially determining the SYT field values of the associated CIPs by sequentially incrementing the SYT field values; and inserting the generated CIP header values including the SYT field values.

31. The method as recited in claim 29, wherein empty CIPs are transmitted by transmitting the data for the next respective CIPs.

32. The method as recited in claim 29, wherein the operation e) further includes:

feeding back the cycle transmit time; and adjusting the new SYT field values in response to the cycle transmit time to obtain a desired data rate.

33. The method as recited in claim 29, wherein the operation e) further includes:

copying the new CIP data into the CIP data fields of the buffers from which the CIPs have been transmitted; and computing new CIP header values including the new SYT field values.

34. The method as recited in claim 29, wherein serial bus is an IEEE 1394 bus.

35. The method as recited in claim 29, wherein the A/V data is isochronously transmitted over the serial bus to an A/V device for presentation.

\* \* \* \* \*